(12) United States Patent
Suga

(10) Patent No.: US 6,791,624 B1
(45) Date of Patent: Sep. 14, 2004

(54) TELEVISION RECEIVER IMAGE PROCESSING USING DISPLAY OF DIFFERENT IMAGE QUALITY ADJUSTED IMAGES

(75) Inventor: Kazumi Suga, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 552 days.

(21) Appl. No.: 09/690,004

(22) Filed: Oct. 17, 2000

(30) Foreign Application Priority Data

Oct. 19, 1999 (JP) .......................................... 11-297152

(51) Int. Cl.$^7$ ................................................ H04N 9/74
(52) U.S. Cl. ...................... 348/588; 348/553; 348/625; 348/184; 348/564
(58) Field of Search ................................ 748/565, 588, 748/564, 180, 184, 74, 553, 71, 567, 722, 566; 745/723; 348/333.01, 333.05, 333.11, 333.12, 625; 382/309

(56) References Cited

U.S. PATENT DOCUMENTS

| 4,800,376 A | * | 1/1989 | Suga et al. .................. 340/721 |
| 4,829,370 A | * | 5/1989 | Mayne et al. ................ 358/537 |
| 5,913,019 A | * | 6/1999 | Attenberg ................... 358/1.18 |
| 5,978,042 A | * | 11/1999 | Vaske et al. ................. 348/565 |
| 6,313,877 B1 | * | 11/2001 | Anderson .............. 348/333.05 |
| 6,388,702 B1 | * | 5/2002 | Konomura et al. ........... 348/74 |
| 2003/0086004 A1 | * | 5/2003 | Usami ..................... 348/223.1 |

FOREIGN PATENT DOCUMENTS

JP          8-22034          1/1996

* cited by examiner

Primary Examiner—Victor R. Kostak
(74) Attorney, Agent, or Firm—Fitzpatrick, Cella, Harper & Scinto

(57) ABSTRACT

A television receiver according to the present application obtains a plurality of moving image data indicating the same moving image by using received moving image data, performs different image quality adjusting processes for these moving image data, and displays a plurality of moving images related to these moving image data subjected to the different image quality adjusting processes on the same screen of a display device.

7 Claims, 17 Drawing Sheets

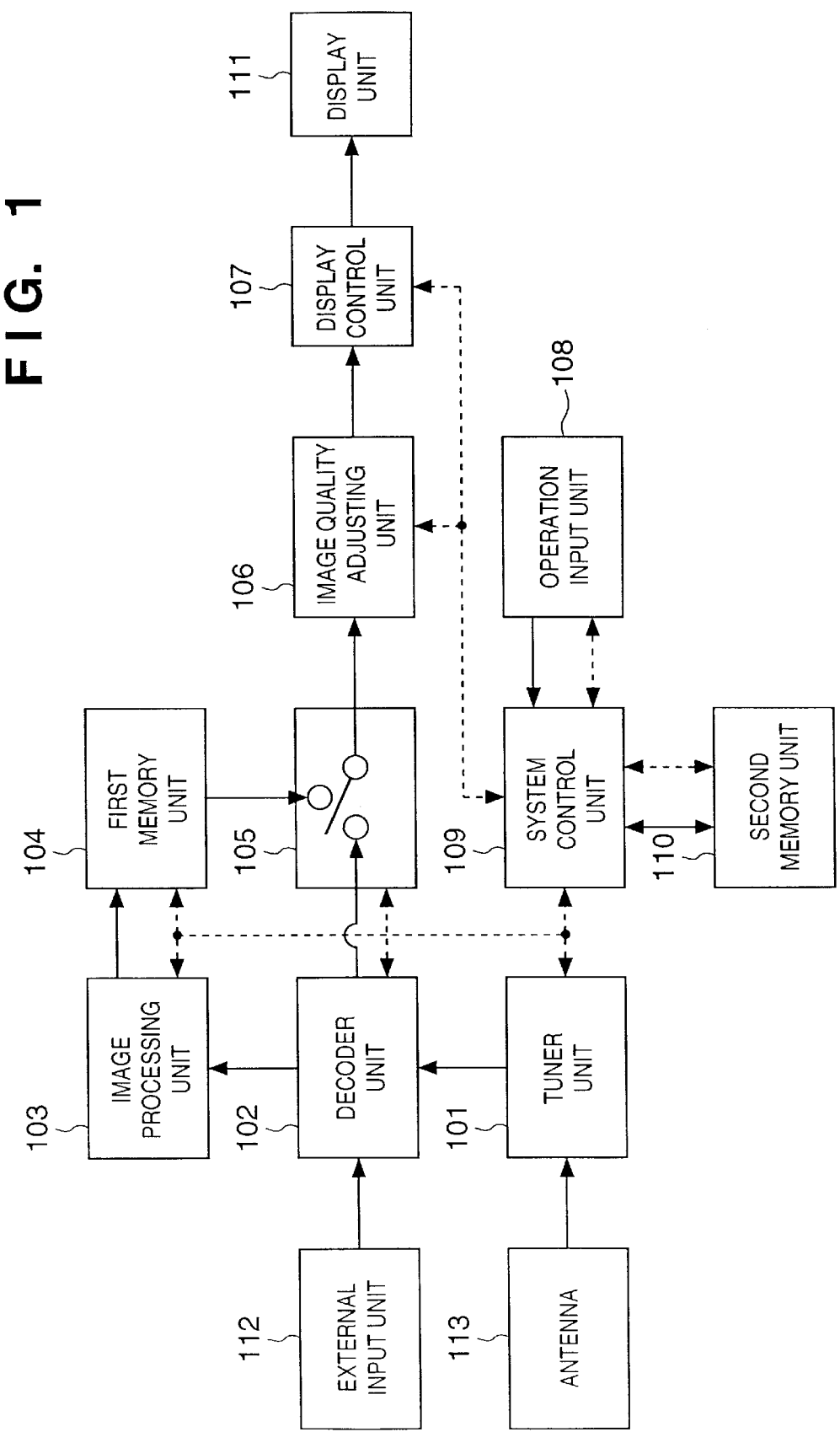

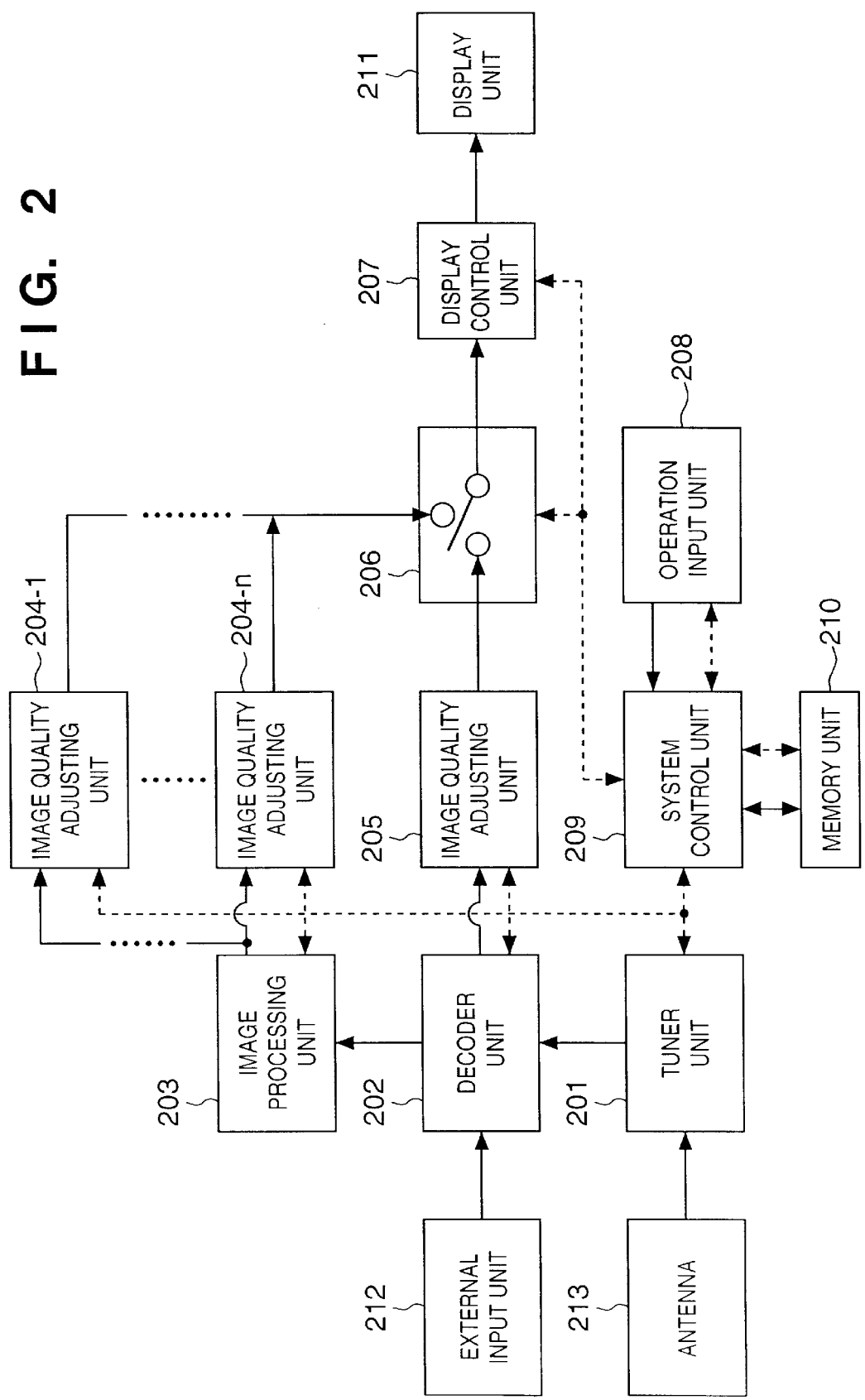

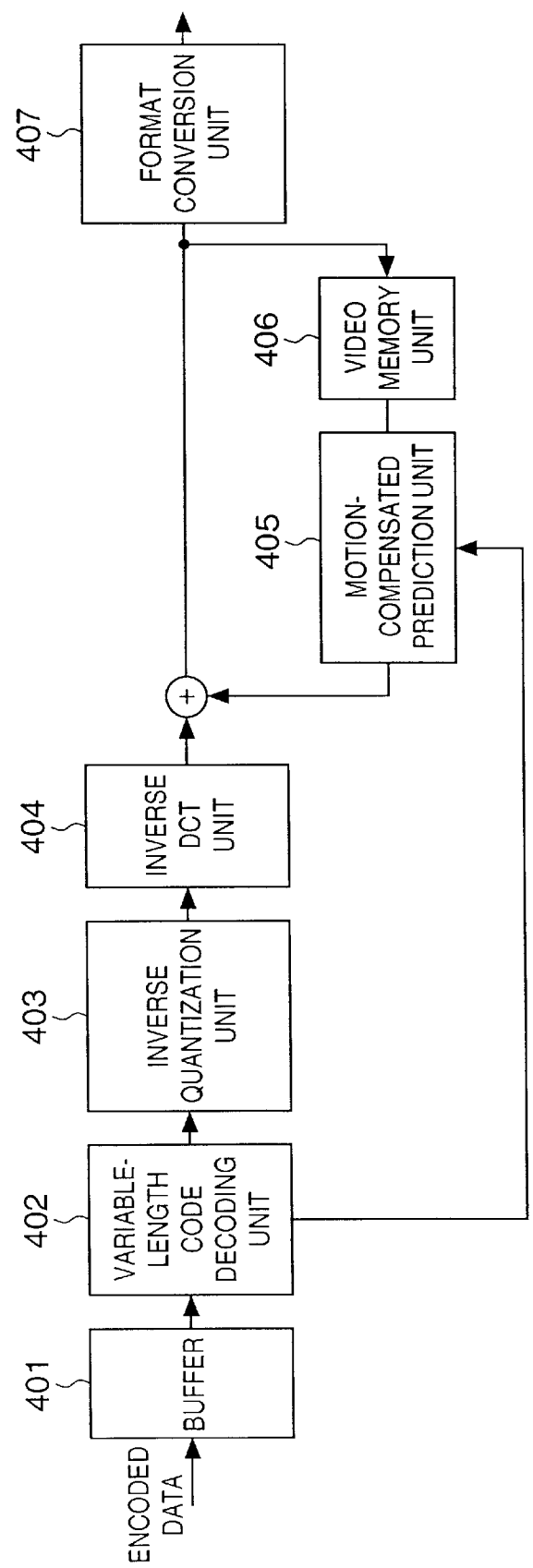

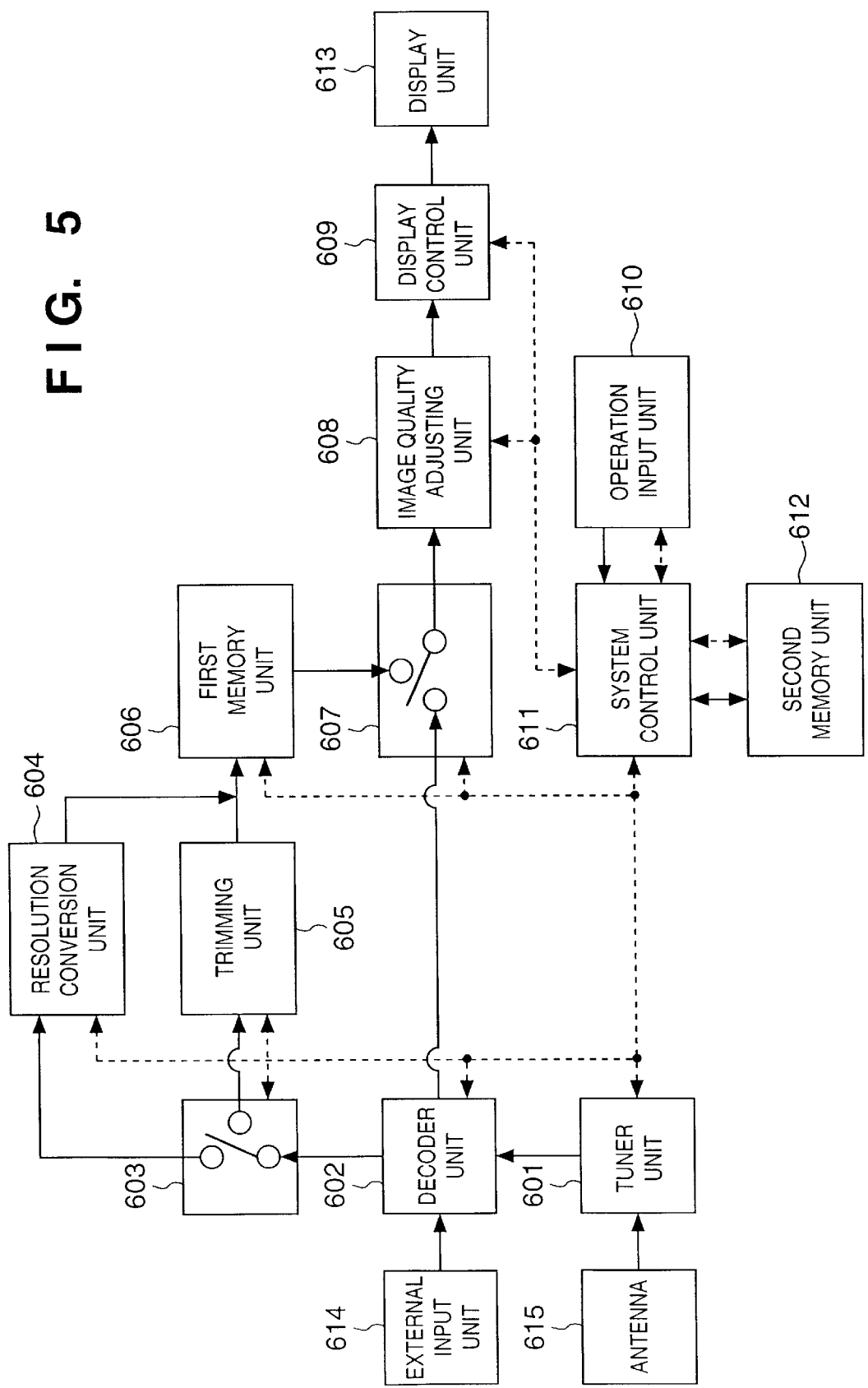

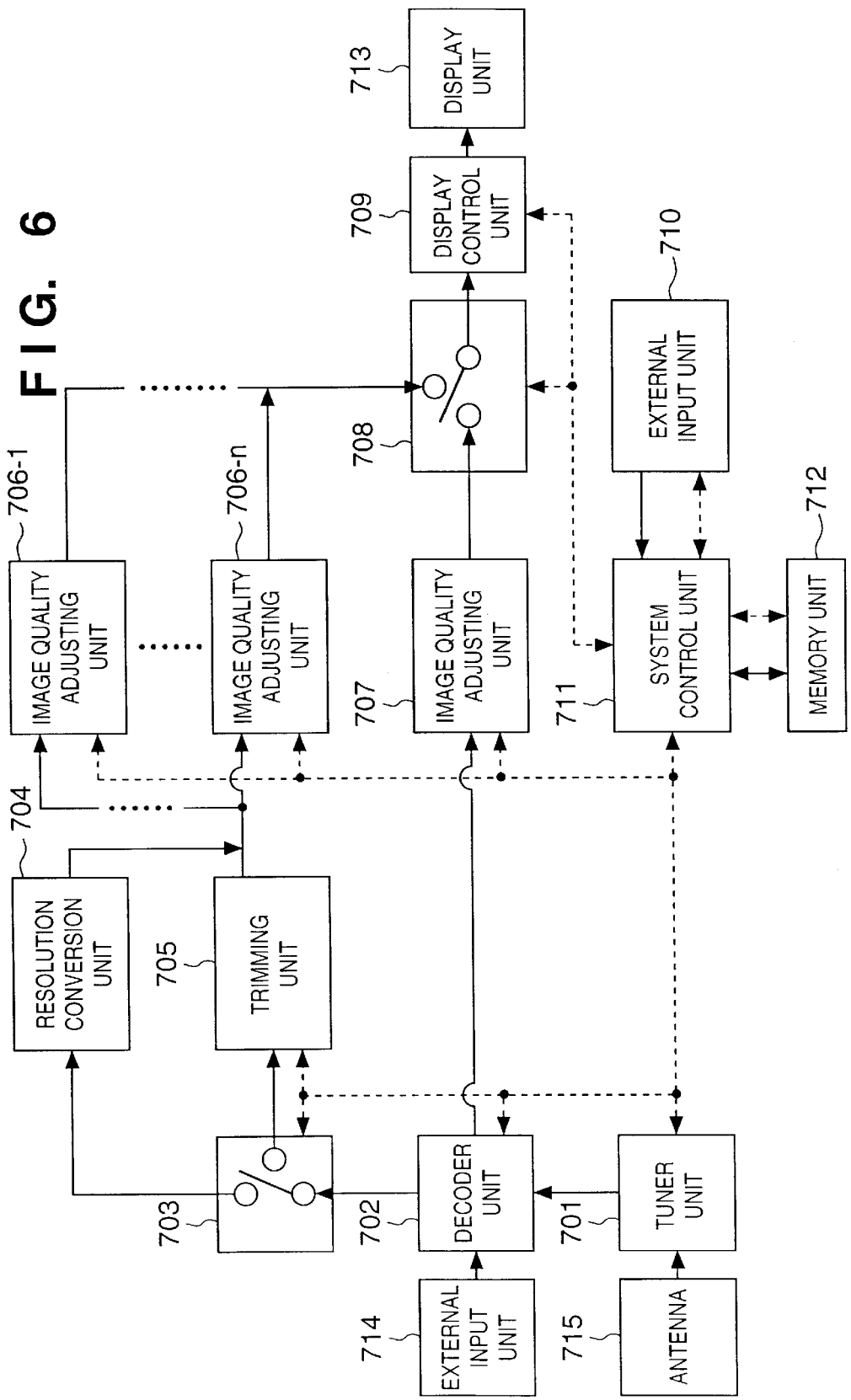

FIG. 8

| COMPONENT ID | BRIGHTNESS | CONTRAST | SHARPNESS | HUE |
|---|---|---|---|---|
| 1 | STANDARD | STANDARD | STANDARD | STANDARD |
| 2 | HIGH | LOW | LOW | STANDARD |
| 3 | STANDARD | HIGH | HIGH | STANDARD |
| 4 | LOW | STANDARD | STANDARD | REDDISH |

FIG. 9

| COMPONENT ID | BRIGHTNESS | CONTRAST | SHARPNESS | HUE |
|---|---|---|---|---|
| 1 | STANDARD | STANDARD | STANDARD | STANDARD |
| 2 | HIGH | LOW | LOW | STANDARD |
| 3 | STANDARD | HIGH | HIGH | STANDARD |
| 4 | LOW | STANDARD | STANDARD | REDDISH |
| 5 | HIGH | STANDARD | STANDARD | STANDARD |
| 6 | STANDARD | HIGH | STANDARD | STANDARD |
| 7 | STANDARD | STANDARD | HIGH | STANDARD |
| 8 | STANDARD | STANDARD | STANDARD | REDDISH |
| 9 | STANDARD | STANDARD | STANDARD | BLUISH |

FIG. 14

| COMPONENT ID | BRIGHTNESS | CONTRAST | SHARPNESS | HUE | TEMPORAL FILTER |
|---|---|---|---|---|---|
| 1 | STANDARD | STANDARD | STANDARD | STANDARD | OFF |
| 2 | HIGH | LOW | LOW | STANDARD | LOW-PASS |
| 3 | STANDARD | HIGH | HIGH | STANDARD | HIGH-PASS |
| 4 | LOW | STANDARD | STANDARD | REDDISH | OFF |

FIG. 15

| COMPONENT ID | BRIGHTNESS | CONTRAST | SHARPNESS | HUE | TEMPORAL FILTER |
|---|---|---|---|---|---|
| 1 | STANDARD | STANDARD | STANDARD | STANDARD | OFF |
| 2 | HIGH | LOW | LOW | STANDARD | LOW-PASS |
| 3 | STANDARD | HIGH | HIGH | STANDARD | HIGH-PASS |
| 4 | LOW | STANDARD | STANDARD | REDDISH | OFF |
| 5 | HIGH | STANDARD | STANDARD | STANDARD | OFF |
| 6 | STANDARD | HIGH | STANDARD | STANDARD | HIGH-PASS |
| 7 | STANDARD | STANDARD | HIGH | STANDARD | HIGH-PASS |
| 8 | STANDARD | STANDARD | STANDARD | REDDISH | OFF |
| 9 | STANDARD | STANDARD | STANDARD | BLUISH | OFF |

TELEVISION RECEIVER IMAGE PROCESSING USING DISPLAY OF DIFFERENT IMAGE QUALITY ADJUSTED IMAGES

FIELD OF THE INVENTION

The present invention relates to a television receiver and an image quality adjusting method, image processing apparatus, and image processing method of the television receiver and, more particularly, to adjustment of, e.g., the brightness, contrast, and hue of an image to be displayed.

BACKGROUND OF THE INVENTION

Conventionally, an operator separately adjusts the luminance, contrast, hue, and the like of, e.g., a television receiver or computer monitor by using adjustment knobs in accordance with OSD (On Screen Display), thereby adjusting the image quality.

Also, as disclosed in Japanese Patent Publication No. 8-22034, an image quality adjusting apparatus has been proposed by which a plurality of data sets (combinations) of a plurality of types of image quality adjustment items are prestored, and an operator can select a desired data set from these prestored sets. This image quality adjusting apparatus proposed in Japanese Patent Publication No. 8-22034 will be described below with reference to FIG. 17.

Referring to FIG. 17, a video circuit 308 includes a Y/C separating circuit, color synchronizing circuit, color demodulating circuit, and the like. The Y/C separating circuit performs general processing for a video signal before or after an image quality adjusting circuit 303, thereby separating a luminance signal and color signal from this video signal. A deflecting high-voltage circuit 309 relates to deflection of a display 306 and high voltages. A power amplifier 310 drives a loudspeaker.

A menu 305 allows an operator to select a desired choice from choices A to D of each of video and audio. A menu memory 313 stores a plurality of data corresponding to the choices of the menu 305. That is, this menu memory 313 stores video menu data A to D as image quality control signals, and audio menu data A to D as audio control signals, for adjusting individual image quality setting elements.

A D/A converter 311 converts image quality control data and audio control data output as digital signals from a microcomputer 312 to the image quality adjusting circuit 303 and a sound quality adjusting circuit 304, respectively, into analog signals.

In the above configuration, when an operator selects any choices for video and audio from the menu 305 by using an operation key 302, the microcomputer 312 reads out data of an image quality control signal and data of an audio control signal, corresponding to the selected video and audio choices, from the menu memory 313. The microcomputer 312 outputs an image with the image quality and sound quality corresponding to the readout data.

In a system in which an operator separately operates adjustment knobs for individual image quality adjustment items (e.g., luminance and contrast) as described above, the operator can obtain desired image quality. However, the operation is complicated.

Also, in the configuration shown in FIG. 17, an operator selects a choice from the menu 305. Hence, this selected choice is not necessarily able to display an image with image quality desired by the operator.

Until an image is displayed with a desired image quality, therefore, the operator must repeatedly select a choice from the menu and confirm the image displayed in accordance with the selected image quality. This results in an inconvenient operation.

SUMMARY OF THE INVENTION

It is an object of the present invention to solve the problems as described above.

It is another object of the present invention to easily adjust a displayed image to desired image quality by a user.

To achieve the above objects, a television receiver of the present invention comprises receiving means for receiving a television signal containing moving image data, generating means for generating a plurality of moving image data indicating the same moving image by using the moving image data obtained by the receiving means, image quality adjusting means for performing different image quality adjusting processes for the plurality of moving image data to generate a plurality of adjusted moving image data, and display control means for displaying a plurality of moving images related to the plurality of adjusted moving image data generated by the image quality adjusting means on the same screen of a display device. And in the television receiver, the plurality of moving images displayed on the same screen indicate the same moving image.

To achieve the same objects, an image processing apparatus of the present invention comprises input means for inputting moving image data, extracting means for extracting image data of one desired frame from the moving image data, processing means for trimming a part of the one-frame image data extracted by the extracting means, in which the processing means comprises designating means for designating a desired trimming position in the one-frame image, and performs the trimming in accordance with the trimming position designated by the designating means, image quality adjusting means for performing different image quality adjusting processes for a plurality of one-frame image data indicating the same image which are output from the processing means, and display control means for controlling a display device to display, on the same screen, images related to the plurality of one-frame image data output from the image quality adjusting means.

Also, to achieve the above objects, a television receiver, which receives a television signal containing moving image data and displaying a moving image related to the moving image data on a display device, of the present invention comprises an image quality adjustment mode in which a plurality of moving images related to a plurality of adjusted moving image data generated by performing different image quality adjusting processes for a plurality of moving image data indicating the same moving image are displayed on the same screen of the display device, and a normal mode in which the image quality of one received moving image data is adjusted in accordance with a moving image selected from a plurality of moving images displayed on the same screen, and a moving image related to the moving image data having the adjusted image quality is displayed on the display device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing the configuration of a television receiver according to the first embodiment;

FIG. 2 is a block diagram showing the configuration of a television receiver according to the second embodiment;

FIG. 3 is a block diagram showing the arrangement of a decoder unit included in the television receivers according to the embodiments of the present invention;

FIG. 5 is a block diagram showing the configuration of a television receiver according to the third embodiment;

FIG. 6 is a block diagram showing the configuration of a television receiver according to the fourth embodiment;

FIG. 8 is a view for explaining combination patterns of image quality adjustment which an image quality adjusting unit operates in an adjustment mode in the embodiments of the present invention;

FIG. 9 is a view for explaining combination patterns of image quality adjustment which the image quality adjusting unit operates in the adjustment mode in the embodiments of the present invention;

FIG. 14 is a view for explaining combination patterns of image quality adjustment which the image quality adjusting unit performs in the adjustment mode in the embodiments of the present invention;

FIG. 15 is a view for explaining combination patterns of image quality adjustment which the image quality adjusting unit performs in the adjustment mode in the embodiments of the present invention;

DETAILED DESCRIPTION OF THE PREFERRED EMBODIMENTS

Figure 4A:
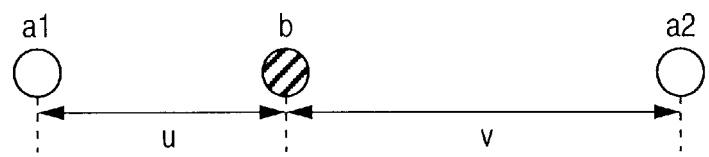
FIGS. 4A to 4C are views for explaining resolution conversion performed by an image processing unit included in the television receivers according to the embodiments of the present invention.

A television receiver according to the present invention will be described in detail below with reference to the accompanying drawings.

First Embodiment

FIG. 1 is a block diagram showing the configuration of a television receiver according to the first embodiment. Referring to FIG. 1, the solid lines indicate data lines, and the broken lines indicate control lines.

The television receiver shown in FIG. 1 comprises a tuner unit 101, a decoder unit 102, an image processing unit 103, a first memory unit 104, a switch unit 105, an image quality adjusting unit 106, a display control unit 107, an operation input unit 108, a system control unit 109, a second memory unit 110, a display unit 111, an external input unit 112, and an antenna 113.

First, the operation of this television receiver shown in FIG. 1 will be described below.

The television receiver according to this embodiment can take two operation modes: "adjustment mode" by which the image quality of a displayed image can be adjusted; and "normal mode" by which a user can watch television as a common television receiver without any image quality adjustment. These modes can be set by the operation input unit 108.

That is, in the normal mode the decoder unit 102 decodes an output signal from the tuner unit 101 or a bit stream supplied from the external input unit 112. The decoded signal is supplied to the image quality adjusting unit 106 via the switch unit 105. The image quality adjusting unit 106 converts the signal into a composite video signal by performing predetermined image quality adjustment of adjusting the signal to image quality currently being set, and outputs the composite video signal to the display control unit 107. The display control unit 107 outputs this composite video signal to the display unit 111 and displays an image based on this video signal on the display unit 111.

In the adjustment mode, the decoder unit 102 extracts a still image of one given frame from a decoded signal of an input signal from the tuner unit 101 or the external input unit 112, and outputs the image to the image processing unit 103. This still image of one frame can be extracted at an arbitrary timing designated by the system control unit 109 or in accordance with designation by a user from the operation input unit 108.

Figure 10:
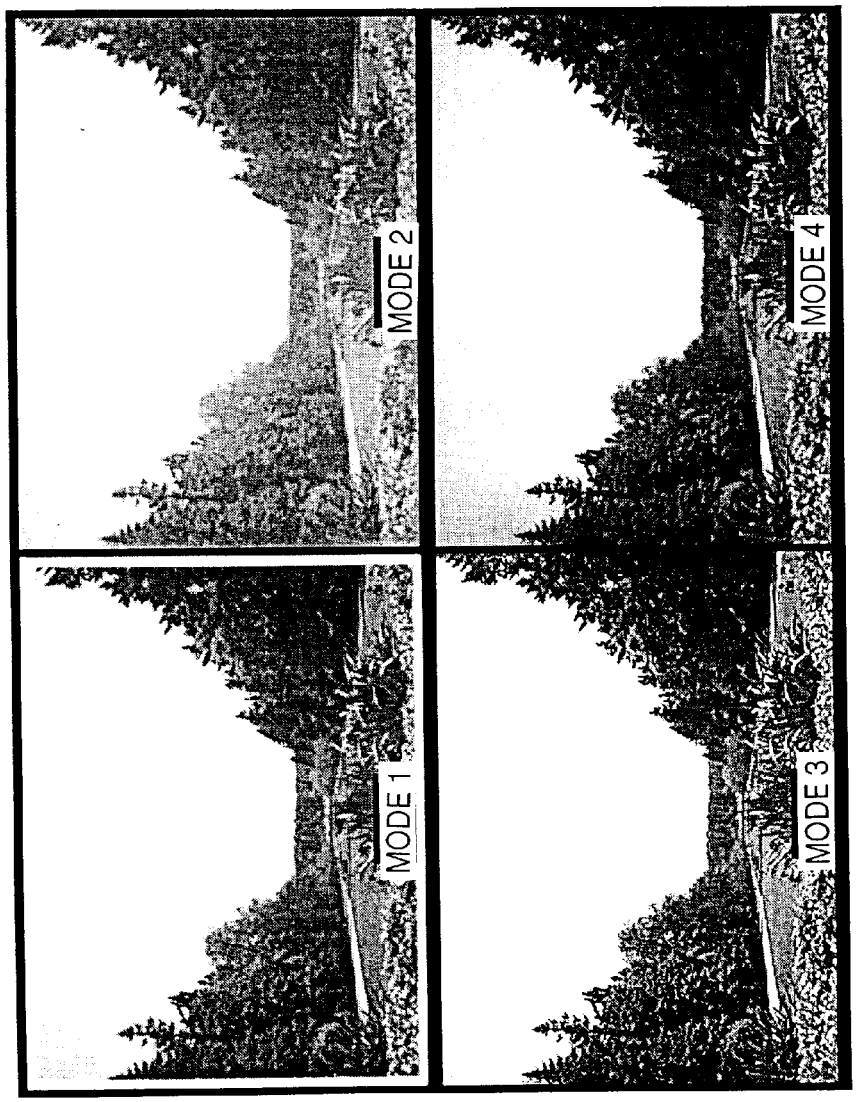
FIG. 10 is a view showing an adjustment window displayed when image quality is to be adjusted.
Figure 11:
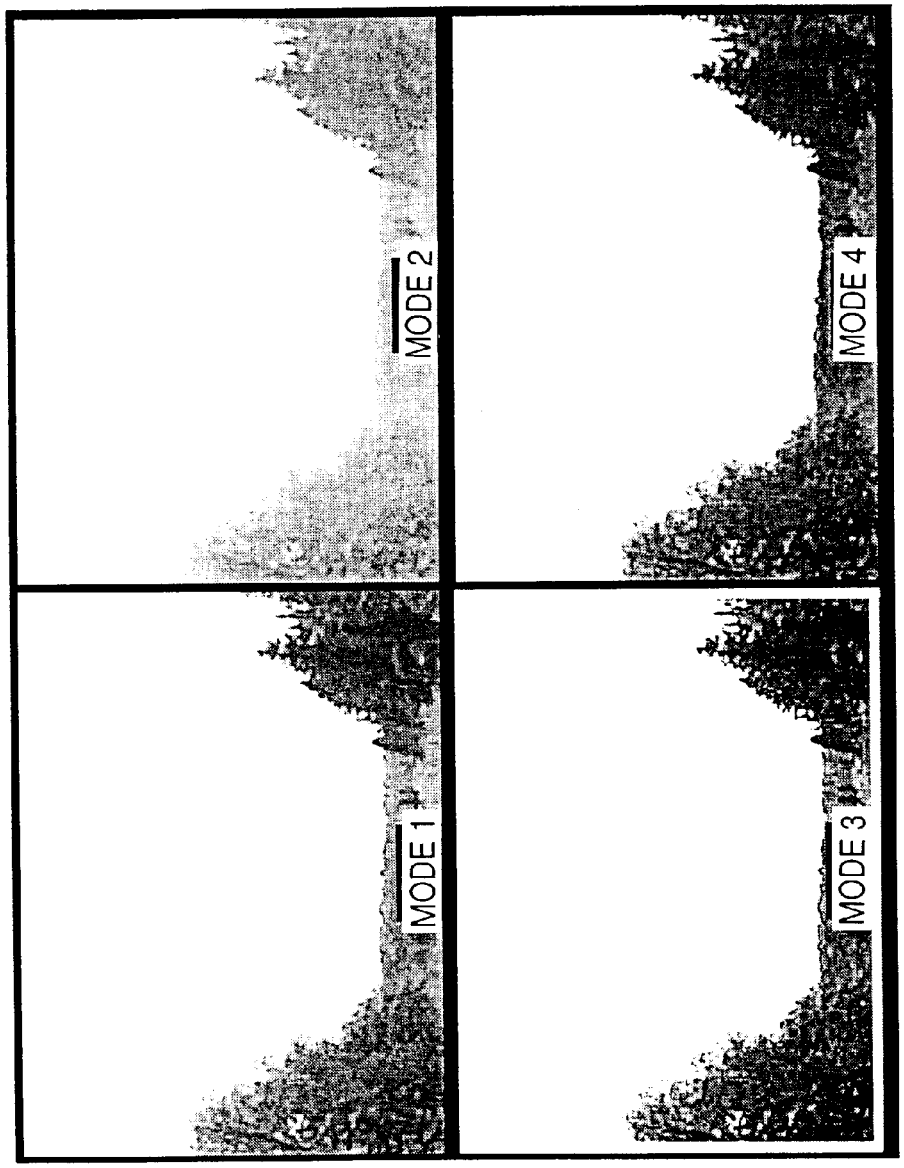
FIG. 11 is a view showing an adjustment window displayed when image quality is to be adjusted.

The image processing unit 103 reduces or trims the input still image into a desired size. This reduced or trimmed still image (to be referred to as a processed still image hereinafter) is stored in the first memory unit 104. The image quality adjusting unit 106 repeatedly reads out the processed still image of one frame, stored in the first memory unit 104, a plurality of times, and performs different image quality adjusting processes for these readout processed still images. The processed still image signals thus given different image qualities by the image quality adjusting unit 106 are output as image signals of one frame to the display control unit 107. These image signals are displayed as sample images for image quality adjustment on the display unit 111 as shown in FIG. 10 or 11.

Each block of the television receiver shown in FIG. 1 will be described in detail below.

<Tuner Unit 101>

A television signal received by the antenna 113 is input to the tuner unit 101. The tuner unit 101 generates an MPEG2-TS (Moving Picture Experts Group 2-Transport Stream) by performing demodulation, error correction, and the like for the received data. When an operator designates a desired channel, the tuner unit 101 acquires the PID (Packet ID) number of a packet for transmitting components constituting the channel, by looking up a PAT (Program Association Table) and a PMT (Program Map Table) multiplexed in the TS.

In accordance with the acquired PID number, the tuner unit 101 switches to a transponder corresponding to the television signal to be received by the antenna 113. The tuner unit 101 generates a TS from diverse digital television broadcasting programs externally input via the transponder, and outputs the generated TS to the decoder unit 102. In this embodiment, the television signal is an MPEG2-TS signal.

<Decoder Unit 102>

FIG. 3 is a block diagram showing the arrangement of the decoder unit 102 included in the television receiver according to the first embodiment.

This decoder unit 102 comprises a buffer unit 401, a variable-length code decoding unit 402, an inverse quantization unit 403, an inverse DCT (Discrete Cosine Transform) unit 404, a motion-compensated prediction unit 405, a video memory unit 406, and a format conversion unit 407.

(Buffer Unit 401)

The buffer unit 401 temporarily stores an output video signal from the tuner unit 101 or encoded data supplied from the external input unit 112.

(Variable-length Code Decoding Unit 402)

The variable-length code decoding unit 402 reads out the encoded data buffered in the buffer unit 401 and decodes macro-block encoding information from the readout encoded data. Also, the variable-length code decoding unit 402 separates an encoding mode, motion vector, quantizing information, and quantized DCT coefficient. In variable-length encoding performed by an encoder of a transmitter (not shown), data having a higher appearance frequency is assigned a shorter code. In variable-length decoding performed by the variable-length code decoding unit 402 on the receiving side, processing reverse to the encoding process is performed.

(Inverse Quantization Unit 403)

The inverse quantization unit 403 inversely quantizes the 8×8 quantized DCT coefficient decoded by the variable-length code decoding unit 402, thereby restoring the DCT coefficient. Quantization is performed using a quantization table predetermined in accordance with the human visual characteristics, in order to spatially reduce information to be transmitted by the encoder of the transmitter (not shown). In inverse quantization by the inverse quantization unit 403 on the receiving side, processing reverse to the quantization is performed by looking up a predetermined inverse quantization table.

(Inverse DCT Unit 404)

The inverse DCT unit 404 converts the output DCT coefficient from the inverse quantization unit 403 into pixel space data. DCT and inverse DCT operations are defined by real-number operations. Since quantization is inserted between the two operations, however, the result of the inverse DCT operation by the decoder unit 102 does not necessarily match the DCT input value and is not always an integer. Therefore, if the digits below the decimal point of the operation result are 0.5, they may or may not be dropped by rounding. This mismatching cannot be solved however high the operation accuracy is set. Accordingly, this embodiment decreases the probability that the digits below the decimal point of the inverse DCT operation result having no error become 0.5, by finely changing the coefficient value after inverse quantization.

(Motion-compensated Prediction Unit 405)

The motion-compensated prediction unit 405 can take a motion-compensated prediction mode and an intra-encoding mode. The system control unit 109 controls switching of these modes.

In the motion-compensated prediction mode, the motion-compensated prediction unit 405 adds data of an image block subjected to motion-compensated prediction to output data from the inverse DCT unit 404. This processing is not performed in the intra-encoding mode that is determined in units of macro blocks. The motion-compensated prediction mode is used when a high encoding efficiency can be expected if a temporal correlation is high. The intra-encoding mode is used when no temporal correlation can be expected owing to, e.g., a large change in a scene.

(Video Memory Unit 406)

The video memory unit 406 stores I (Intra coded) pictures and P (Predictive coded) pictures as reference pixels used in decoding.

(Format Conversion Unit 407)

The format conversion unit 407 rearranges I pictures, P pictures, and B (Bidirectionally predictive coded) pictures, arranged by the variable-length code decoding unit 402 to improve the encoding efficiency, into the original input order. Also, the format conversion unit 407 converts the image size where necessary.

<Image Processing Unit 103>

The image processing unit 103 reads out a video signal of one arbitrary frame from the decoder unit 102. For this readout video signal, the image processing unit 103 performs reduction by resolution conversion or trimming (cutting) to form a partial image as a base for image quality adjustment.

The resolution conversion and trimming performed by the image processing unit 103 will be described below.

(Resolution Conversion)

In the resolution conversion performed by the image processing unit 103, a whole video signal of one frame having horizontal and vertical resolutions of, e.g., 640×480 pixels is reduced to a resolution of 320×240 pixels (when the reduction ratio is 1/2 in both horizontal and vertical directions).

Figure 4B:
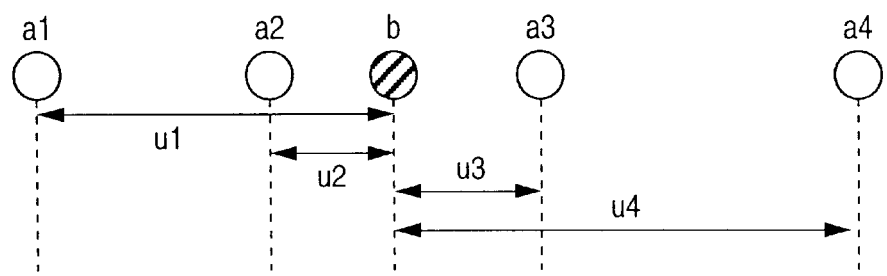
Figure 4C:
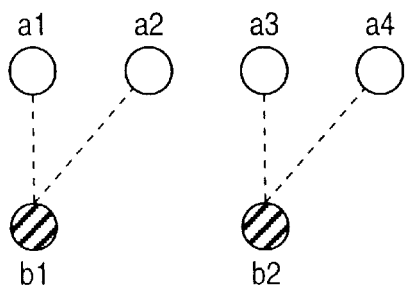

FIGS. 4A to 4C are views for explaining the resolution conversion by the image processing unit included in the television receiver according to the first embodiment.

As a method of this resolution conversion, it is possible to use a method which uses resolution conversion pixels by using an FIR (Finite Impulse Response) filter. Examples are nearest neighbor interpolation, linear interpolation, and cubic convolutional interpolation.

Nearest neighbor interpolation is a method which uses an input pixel (a pixel used to form a pixel to be inserted for interpolation) nearest to an output pixel (a pixel to be inserted for interpolation: an interpolation pixel) as an interpolation pixel. That is, assume in FIG. 4A that a pixel b is to be inserted into a position (between input pixels a1 and a2) at distances u and v from the input pixels a1 and a2, respectively, arranged at a distance of 1. If the distance u is smaller than the distance v, a1 is used as the interpolation pixel b. If the distances u and v are equal (if the resolution conversion ratio is an integral multiple), the former data a1 is used as the interpolation data b. It is of course also possible to use the latter data a2.

As an example, assume, as shown in FIG. 4C, that the resolution is to be converted (reduced) by 1/2. In this case, output data of two pixels is formed from input data of four pixels. Therefore, pixel data bn after resolution conversion is performed by nearest neighbor interpolation is given by $$b_{n+1}=a_{2n+1}(n=0, 1, 2, \ldots) \qquad (1)$$

by using input data an. Alternatively, $$b_{n+1}=a_{2n+2}(n=0, 1, 2, \ldots) \qquad (2)$$

Linear interpolation is a method which uses pixel data of pixels on the two sides of a position in which a pixel is to be interpolated, and obtains pixel data of the pixel to be inserted into the position. For example, when, as shown in FIG. 4A, the pixel b is to be inserted into the position (between the pixels a1 and a2) at the distances u and v from the pixels a1 and a2, respectively, arranged at a distance of 1, pixel data of the pixel b is obtained by $$b=a1\times v/(u+v)+a2\times u/(u+v) \quad (3)$$

Cubic convolutional interpolation is a method which uses pixel data of two pixels on each of the two sides of a position into which a pixel is to be inserted and a cubic convolution function (cubic function), and obtains pixel data of the pixel to be inserted. A cubic convolution function f can be obtained by performing window function processing such that a Sin function given by equation (4) is cut by regions of five taps, i.e., a pixel to be interpolated and four pixels, two one each side, arranged at a distance of 1. Accordingly, from the position into which a pixel is to be inserted and the range of a distance t between two pixels on each side, the cubic convolution function f is given by $$f(t)=\operatorname{Sin}(\pi t)/(\pi t) \quad (4)$$

$$f(t)=1-2\times|t|2+|t|3(0\leq|t|<1) \quad (5)$$

$$f(t)=4-8\times|t|+5\times|t|2-|t|3(1\leq|t|<2) \quad (6)$$

$$f(t)=0(2\leq|t|) \quad (7)$$

For example, assume, as shown in FIG. 4B, that a pixel b is to be interpolated in a position (between pixels a2 and a3) at distances of u1, u2, u3, and u4 from pixels a1, a2, a3, and a4, respectively, arranged at a distance of 1. Pixel data of the pixel b is obtained by $$b=a1\times(4-8\times u1+5\times u12-u13)+a2\times(1-2\times u22+u23)+a3\times(1-2\times u32+u33)+a4\times(4-8\times u4+5\times u42-u43) \quad (8)$$

by using the cubic convolution function f.

The above explanation is common to enlargement and reduction. In this embodiment, however, only reduction explained by using FIG. 4C is performed. Also, a resolution conversion ratio (e.g., 3/16) except for an integral ratio can be processed as mentioned earlier.

Furthermore, the resolution of two-dimensional image data can be converted by sequentially performing the above processing in the horizontal and vertical directions.

The resolution can also be converted at different magnifications in the horizontal and vertical directions by continuously performing processing in the horizontal direction and processing in the vertical direction independently of each other.

(Trimming)

In trimming performed by the image processing unit 103, only a region of a portion (e.g., 320×240 pixels) of a video signal of one frame having horizontal and vertical resolutions of, e.g., 640×480 pixels is selected and output.

Figure 7A:
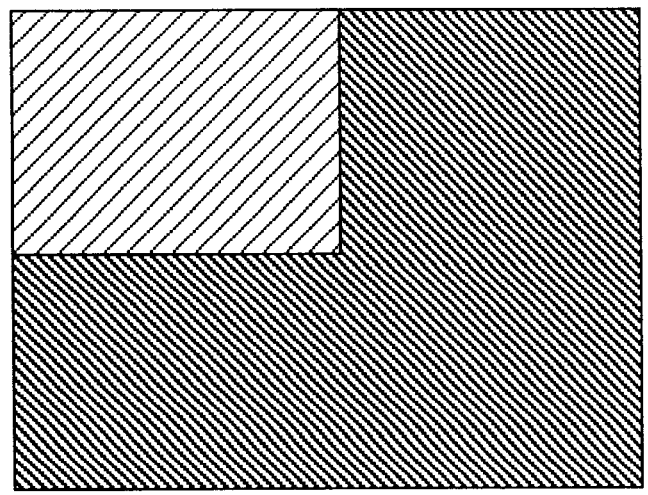
FIGS. 7A and 7B are views for explaining trimming performed in the embodiments of the present invention.
Figure 7B:
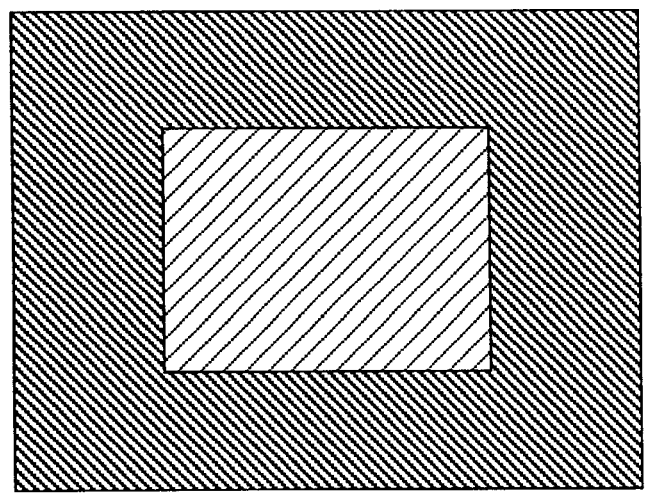

For example, as shown in FIG. 7A, only an upper left region having a 1/4 (1/2 in both the horizontal and vertical directions) area of an entire input signal region is output. A central region can also be output as shown in FIG. 7B.

This region to be trimmed is determined when the system control unit 109 designates trimming start positions in the horizontal and vertical directions and horizontal and vertical widths of the trimming region. The system control unit 109 can also set an arbitrary ratio as the ratio of a region to be trimmed and an input image (a video signal of one frame).

<First Memory Unit 104>

The first memory unit 104 can temporarily store data of a video signal reduced or trimmed by the image processing unit 103 and can also perform high-speed read.

For example, when, as shown in FIG. 7A, output image data from the decoder 102 is reduced or trimmed into an area 1/4 (1/2 in both the horizontal and vertical directions) the original resolution by the image processing unit 103, the reduced video signal of one frame temporarily stored in the first memory unit 104 is read out four times by the image quality adjusting unit 106 (to be described later). That is, when the image data is reduced or trimmed to 1/L in the horizontal direction and reduced or trimmed to 1/M in the vertical direction, the video signal stored in the first memory unit 104 is read out L×M times.

<Switch Unit 105>

Under the control of the system control unit 109, the switch unit 105 switches the normal mode and the adjustment mode in which an operator can select the combination of image quality adjustment items (to be referred to as image quality adjustment components hereinafter) such as luminance and contrast.

That is, when the normal mode is selected, the switch unit 105 transfers an output video signal (e.g., common television broadcasting) from the decoder unit 102 to the image quality adjusting unit 106. When the adjustment mode is selected, the switch unit 105 transfers an output video signal (a reduced or trimmed still image for image quality adjustment) from the first memory unit 104 to the image quality adjusting unit 106.

<Image Quality Adjusting Unit 106>

Image quality adjustment performed by the image quality adjusting unit 106 will be described below with reference to FIGS. 8 to 11.

This image quality adjusting unit 106 adjusts brightness, contrast, sharpness, hue, and the like in combination with each other.

In the normal mode, processing of adjusting a displayed image to an image quality mode selected by an operator in a previously performed adjustment mode, or to an image quality mode in a default state when the television receiver is shipped from the factory (when nothing is set by an operator), is performed with respect to an output signal from the decoder unit 102.

In the adjustment mode, the reduced or trimmed image data of one frame is repeatedly read out L×M times from the first memory unit 104. Whenever the data is read out, the image quality is adjusted using parameter values unique to the adjustment in order to display an adjustment window shown in FIG. 10 or 11.

FIGS. 8 and 9 are views for explaining combination patterns of image quality adjustment which the image quality adjusting unit of the first embodiment performs in the adjustment mode. FIG. 8 shows four combination patterns, and FIG. 9 shows nine combination patterns.

In the settings of combinations shown in FIG. 8, component (combination pattern) ID 1 is a standard state not changed from shipment from the factory. Component ID 2 is the setting of a soft image by which the brightness is increased and the contrast and sharpness are decreased. Component ID 3 is the setting of a brilliant image by which the brightness is decreased and the contrast and sharpness are increased. In the image quality adjustment mode, the image quality adjusting unit 106 controls predetermined circuit elements by predetermined parameter values corresponding to each mode in accordance with a control signal from the system control unit 109, thereby setting the individual adjustment items, i.e., the brightness, contrast, sharpness, and hue.

The combination patterns shown in FIG. 8 must have a one-to-one correspondence with images displayed on the same screen of the display unit 111 as an adjustment window (FIGS. 10 and 11) when an operator adjusts the image quality by monitoring the display unit 111 in the adjustment mode. To this end, the image processing unit 103 reduces or trims an image in accordance with the number of combination patterns under the control of the system control unit 109.

Assume, for example, that the horizontal and vertical display resolutions (size) of the display unit 111 are 640×480 pixels, the output image from the decoder unit 102 has 640×480 pixels, and the number of combination patterns of image quality adjustment is four. In this case, the image processing unit 103 reduces or trims the extracted signal (still image) of o e frame by 1/2 times in both the horizontal and vertical directions.

FIGS. 10 and 11 are views showing adjustment windows displayed on the display unit in the adjustment mode in the first embodiment. FIG. 10 shows reduced images, and FIG. 11 shows trimmed images. In each of FIGS. 10 and 11, the displayed images correspond to the four combination patterns shown in FIG. 8.

<Display Control Unit 107>

In the normal mode, the display control unit 107 converts the output signal from the image quality adjusting unit 106 described above into a signal which can be output to the display unit 111 to be described later, and outputs the converted signal.

This display control unit 107 has a memory capable of storing at least an image signal of one frame which the display unit 111 can display. In the adjustment mode, under the control of the system control unit 109 the display control unit 107 uses this memory to synthesize a video signal of a plurality of images subjected to different image quality adjusting processes performed by the image quality adjusting unit 106. For example, the display control unit 107 forms an operation window of one frame having the layout as shown in FIG. 10 or 11, converts this operation window into a signal which can be output to the display unit 111, and outputs the signal.

<Operation Input Unit 108>

The operation input unit 108 is an external input unit such as a remote controller. An operator can select a desired image from the images (FIG. 10 or 11) subjected to a plurality of different image quality adjusting processes described above.

The system control unit 109 determines input information from the operation input unit 108. In accordance with this determination, each unit shown in FIG. 1 is adjusted. Note that a white frame in mode 1 shown in FIG. 10 and a white frame in mode 3 shown in FIG. 11 indicate image quality adjustment components selected by an operator by using the operation input unit 108.

<Display Unit 111>

The display unit 111 is a dot matrix display such as a liquid crystal display or plasma display, or a CRT display. This display unit 111 displays an image on the basis of an output signal from the display control unit 107.

<Second Memory Unit 110>

The second memory unit 110 stores the image quality adjustment combination pattern tables shown in FIGS. 8 and 9 including an image quality adjustment mode for realizing an image quality mode in a predetermined default state (values set before shipment from the factory) which is read out upon resetting, and the IDs (e.g., the component IDs shown in FIG. 8) of these patterns. This second memory unit 110 also stores image quality adjustment combination patterns (e.g., component IDs 2 to 4 shown in FIG. 8) selected in the adjustment mode by an operator.

In the adjustment mode, the system control unit 109 adjusts the image quality by outputting data of the image quality adjustment modes corresponding to the individual component IDs to the image quality adjusting unit 106 in accordance with the adjustment patterns shown in FIG. 8 or 9.

When an operator selects the adjustment mode, the system control unit 109 controls the display control unit 107 such that the component IDs stored in the second memory unit 110 are displayed as they are discriminable as current set values in an image quality adjustment window (FIG. 10 or 11). For example, the system control unit 109 so controls the display control unit 107 as to put a color frame on an image corresponding to image quality currently being selected, in the images shown in FIGS. 10 and 11.

<System Control Unit 109>

The system control unit 109 will be described below with reference to FIGS. 12 and 13.

Figure 12:
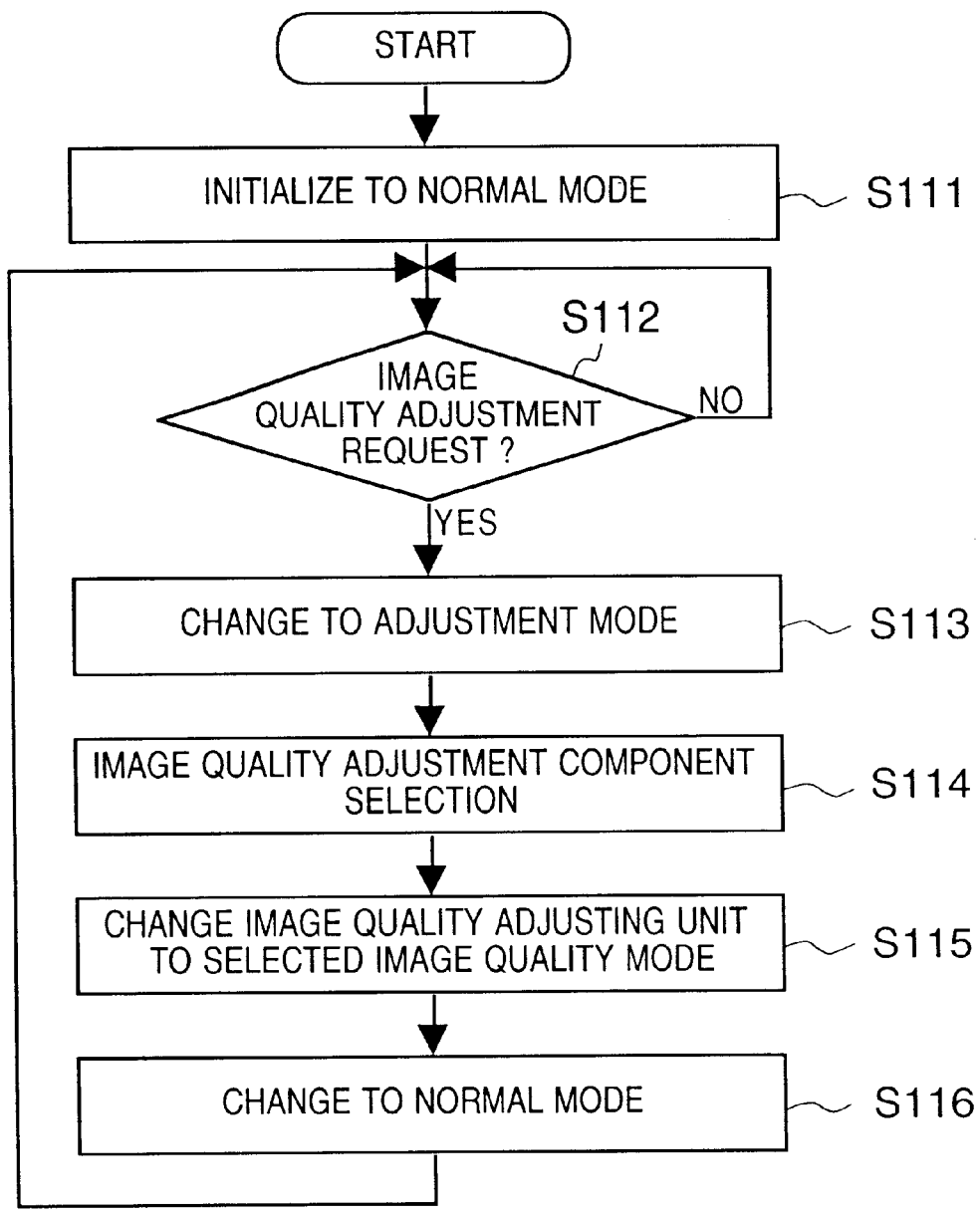
FIG. 12 is a flow chart showing a setting adjusting process performed by a system control unit included in the television receivers according to the embodiments of the present invention.

FIG. 12 is a flow chart showing a setting adjusting process performed by the system control unit 109 included in the television receiver according to the first embodiment. More specifically, FIG. 12 shows a process procedure executed by the microcomputer (not shown) in the system control unit 109. This setting adjusting process is started when the television receiver shown in FIG. 1 is turned on.

Referring to FIG. 12, the microcomputer performs predetermined initialization for the tuner unit 101, the decoder unit 102, and the image processing unit 103, and sets the switch unit 105, the image quality adjusting unit 106, and the system control unit 107 in the normal mode (step S111).

The microcomputer waits until an operator inputs an image quality adjustment request to the operation input unit 108 (step S112). When detecting this input image quality adjustment request, the microcomputer changes the image processing unit 103, the memory unit 104, the switch unit 105, the image quality adjusting unit 106, and the display control unit 107 to the adjustment mode (step S113).

Subsequently, the microcomputer performs an image quality adjustment component selecting process (step S114) and controls the image quality adjusting unit 106 to set an image quality mode corresponding to the image selected by the process (step S115). The microcomputer resets the switch unit 105, the image quality adjusting unit 106, and the display control unit 107 to the normal mode, and the flow returns to step S112.

Details of the image quality adjustment component selecting process in step S114 will be described below.

Figure 13:
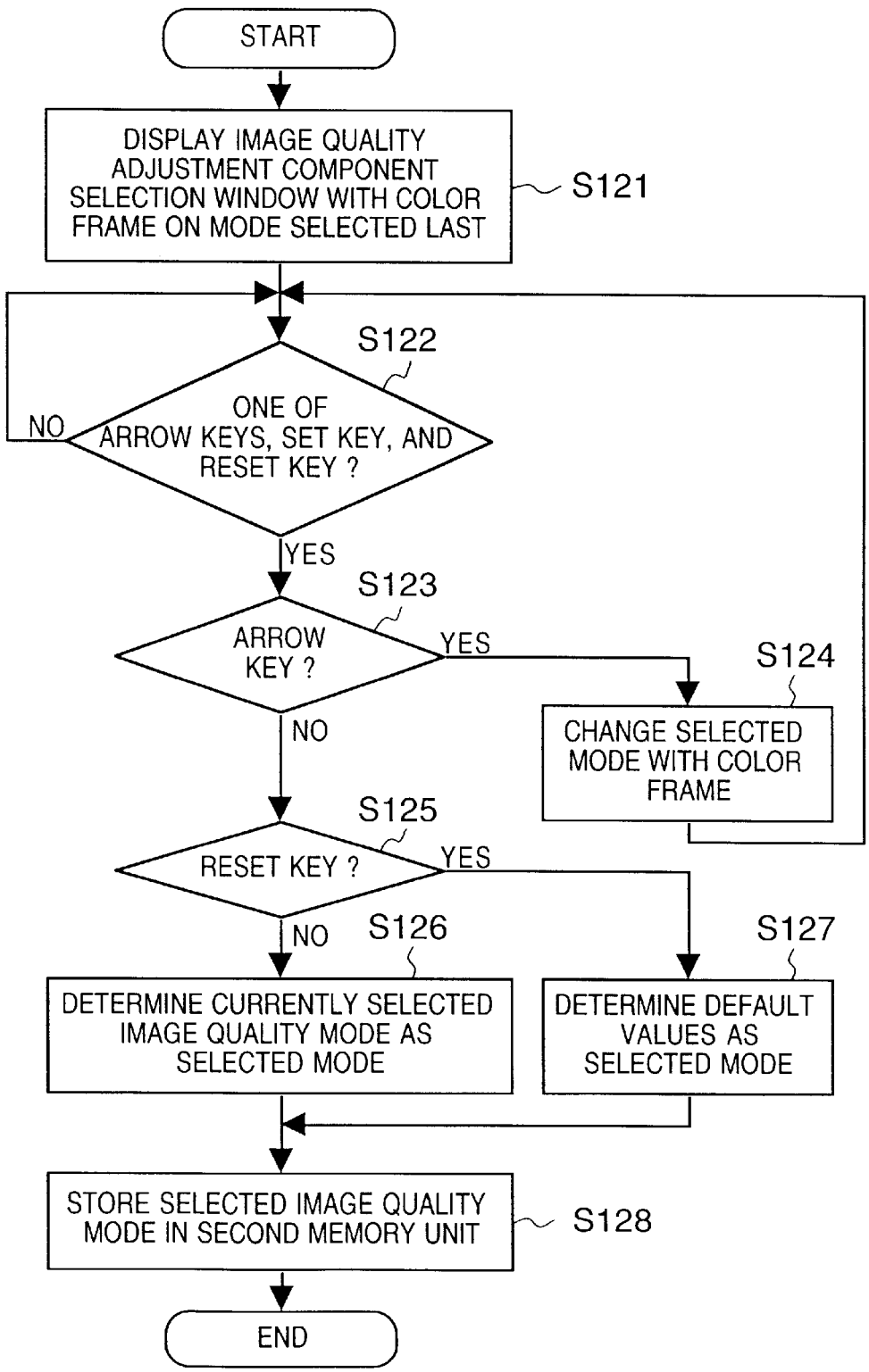
FIG. 13 is a flow chart showing details of an image quality adjustment component selecting process included in the setting adjusting process shown in FIG. 12.

FIG. 13 is a flow chart showing the details of the image quality adjustment component selecting process included in the setting adjusting process shown in FIG. 12.

Referring to FIG. 13, the microcomputer controls the image processing unit 103, the memory unit 104, the switch unit 105, the image quality adjustment unit 106, and the display control unit 107, thereby displaying on the display unit 111 an image quality adjustment window which is shown in FIG. 10 or 11 and in which an image quality mode selected last can be discriminated by, e.g., a color frame (step S121).

The microcomputer waits until one of arrow keys (up, down, left, and right keys), set key (determination key), and reset key (none are shown) of the operation input unit 108 is pressed (step S122). When detecting that one of the arrow keys is pressed, the microcomputer moves the color frame in a direction corresponding to the pressed arrow key and changes the selection mode (step S124), and the flow returns to step S122.

If the set key or reset key is pressed in step S123, the microcomputer checks whether the reset key is pressed. If the reset key is pressed, the microcomputer determines the default setting (the image quality mode set before shipment from the factory) as anew selected mode (step S127). If the set key is pressed, the microcomputer determines the image quality mode of an image currently being selected as a new selected mode (step S126). The microcomputer stores the determined selected mode in the second memory unit 110 (step S128).

In this embodiment as described above, an operator can easily adjust the television receiver to desired image quality only by selecting a still image having a desired image quality from the adjustment window (FIG. 10 or 11) displayed on the display unit 111.

In the image quality adjustment mode, the user can designate from the operation input unit 108 whether to trim or reduce an image signal from the decoder 102 by the image processing unit 103. When the signal is to be trimmed, the user can select a portion to be trimmed from one frame by using the operation input unit 108.

With this configuration, the user can choose an image by which he or she can check the image quality most easily when adjusting the image quality.

The operation input unit 108 can also be equipped with an image quality mode display key. If this display key is pressed when the adjustment window shown in FIG. 10 or 11 is displayed, the image quality mode of individual adjustment items of the selected image can be superposed on the corresponding image.

For example, when a processed still image corresponding to component ID 2 shown in FIG. 8 is selected and the display key is pressed, the system control unit 109 controls the display control unit 107 such that characters indicating an image quality adjustment mode by which Brightness: high Contrast: low Sharpness: low Hue: standard are superposed on the corresponding image.

Second Embodiment

The second embodiment based on the television receiver according to the first embodiment will be described below. In the following description, a duplicate explanation of the same components as in the first embodiment will be omitted, and the characteristic parts of this embodiment will be principally explained.

FIG. 2 is a block diagram showing the configuration of a television receiver according to the second embodiment. Referring to FIG. 2, the solid lines indicate data lines, and the broken lines indicate control lines.

This television receiver shown in FIG. 2 comprises a tuner unit 201, a decoder unit 202, an image processing unit 203, image quality adjusting units 204-1 to 204-n, an image quality adjusting unit 205, a second switch unit 206, a display control unit 207, an operation input unit 208, a system control unit 209, a memory unit 210, a display unit 211, an external input unit 212, and an antenna 213.

First, the difference of this embodiment from the first embodiment will be described below.

The difference of this embodiment is that a video signal to be selected by the image processing unit 203 is not a still image of one frame but a moving image.

More specifically, in the first embodiment a still image of one arbitrary frame is extracted from the decoder unit 102 and reduced or trimmed. A plurality of different image quality adjusting processes are performed for this reduced or trimmed image, and an operator can select desired image quality while monitoring an adjustment window displayed on the display unit 111. In the second embodiment, however, output moving image data from the decoder unit 202 is reduced or trimmed, and a plurality of different image quality adjusting processes are performed parallel for the reduced or trimmed data. An operator can select desired image quality by using a plurality of moving image samples thus processed. Since, therefore, moving images differing in image quality are displayed in real time, this embodiment does not include any memory corresponding to the first memory unit 104 in the first embodiment.

Furthermore, in image quality adjustment in this embodiment, filter processing in the direction of a time base, e.g., high-pass filter processing or low-pass filter processing is performed.

The operation of the television receiver of this embodiment will be described below.

The television receiver of this embodiment can also take two different operation modes: an adjustment mode in which the image quality of a displayed image can be adjusted; and a normal mode in which a user can watch television as a common television receiver without performing any image quality adjustment.

That is, in the normal mode the decoder unit 202 decodes an output signal from the tuner unit 201 or a bit stream supplied from the external input unit 212. The decoded signal is supplied to the image quality adjusting unit 205. The image quality adjusting unit 205 converts the decoded signal into a composite signal by performing predetermined image quality adjustment of adjusting the signal to currently set image quality. The display control unit 207 displays an image based on the composite signal on the display unit 211.

In the adjustment mode, the decoder unit 202 decodes an input signal and outputs this decoded signal to the image processing unit 203. The image processing unit 203 reduces or trims the input moving image to a desired size. This reduced or trimmed moving image (to be referred to as a processed moving image hereinafter) is supplied to the image quality adjusting units 204-1 to 204-n. These image quality adjusting units 204-1 to 204-n perform image quality adjusting processes of adjusting the input processed moving image to different image qualities.

The processed moving images given the different image qualities by the image quality adjusting units 204-1 to 204-n are output to the display control unit 207 via the switch unit 206 and displayed, as sample moving images for image quality adjustment, on the display unit 211 as shown in FIG. 10 or 11 (in this embodiment, each image shown in FIGS. 10 and 11 shows a certain frame in a moving image).

The image quality adjusting processes performed by the image quality adjusting units 204-1 to 204-n as the characteristic features of this embodiment will be described below.

When performing the image quality adjusting processes for the input reduced or trimmed, processed moving image, the image quality adjusting units 204-1 to 204-n also improve the image quality in the time base direction by adding time-base filter processing to the image quality adjustment similar to that in the first embodiment.

FIGS. 14 and 15 are views for explaining combination patterns of image quality adjustment which the image quality adjusting units perform in "adjustment mode" in the second embodiment. FIG. 14 shows four combination patterns, and FIG. 15 shows nine combination patterns.

In the settings of combinations shown in FIG. 14, component (combination pattern) ID 1 is a standard state not changed from shipment from the factory. Component ID 2 is the setting of a soft image by which the brightness is increased, the contrast and sharpness are decreased, and low-pass filter processing is performed in the time base direction. Component ID 3 is the setting of a brilliant image by which the brightness is decreased, the contrast and sharpness are increased, and high-pass filter processing is performed in the time base direction.

Figure 16:
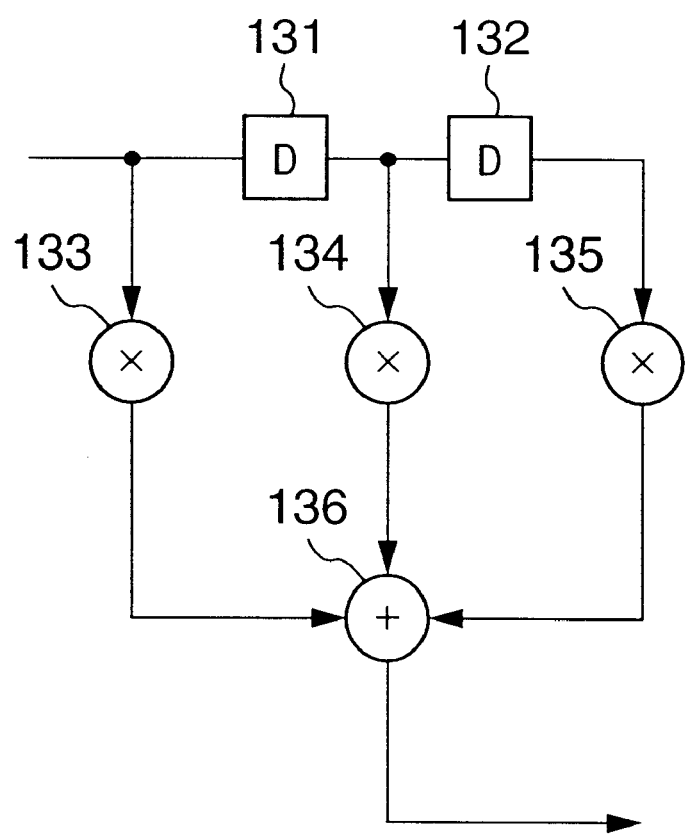
FIG. 16 is a view showing a filter of the image quality adjusting unit in the embodiments of the present invention.
Figure 17:
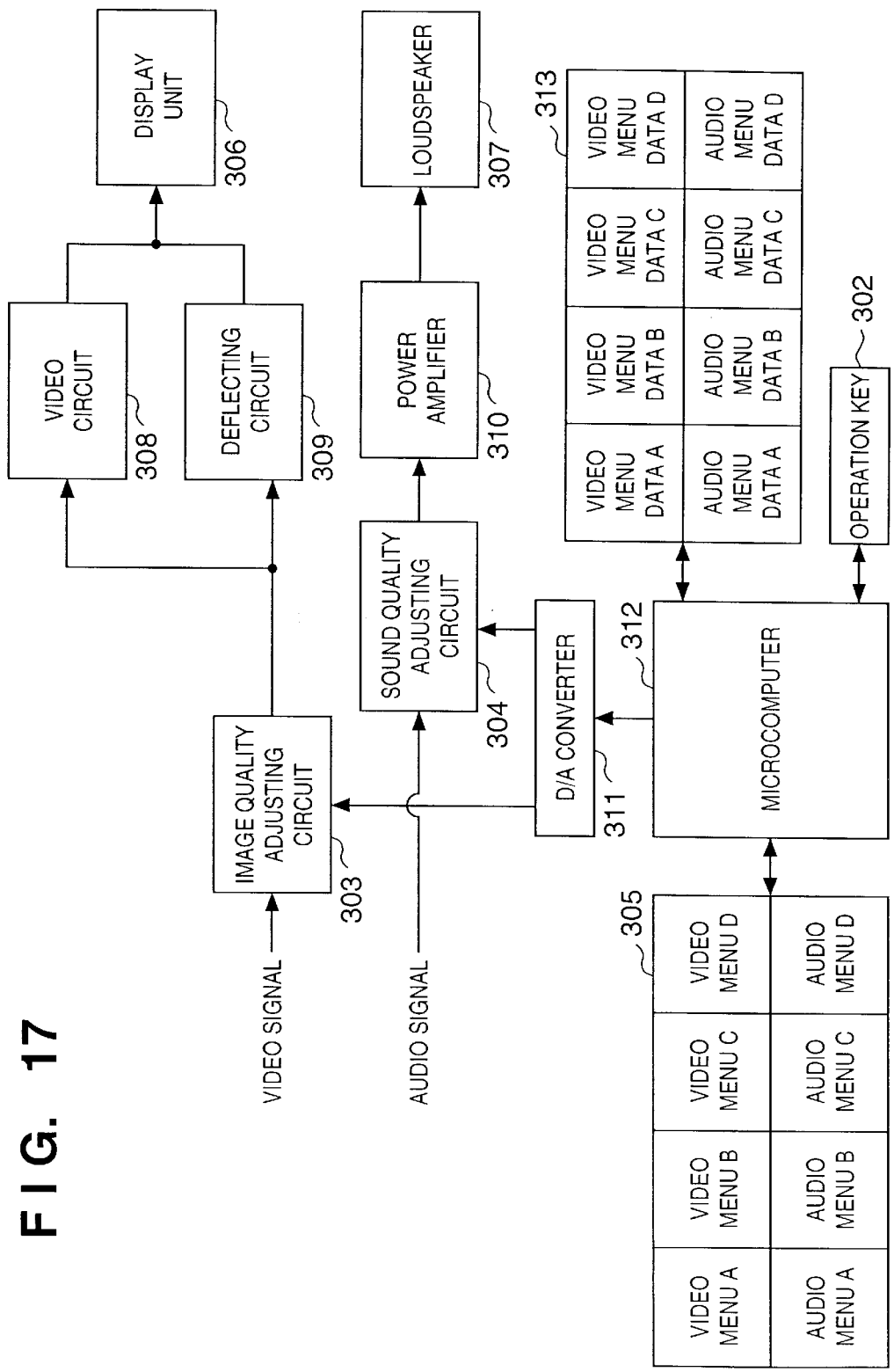
FIG. 17 is a block diagram showing the configuration of an image quality adjusting apparatus as prior art.

FIG. 16 is a view showing a filter of each image quality adjusting unit in the second embodiment.

Referring to FIG. 16, latches 131 and 132 delay input image data by one frame period. Multipliers 133, 134, and 135 multiply the input image data and the output data from the latches 131 and 132 by set coefficients. An adder 136 adds the outputs from the multipliers 133, 134, and 135. The output from this adder 136 is the result of the filter processing.

Low- or high-pass filter processing is realized by changing the coefficients set in the multipliers 133, 134, and 135. For example, a low-pass filter is realized by setting the coefficients of the multipliers 133, 134, and 135 to 1/3. A high-pass filter is implemented by setting the coefficients of the multipliers 133 and 135 to −1 and the coefficient of the multiplier 134 to 2.

Although a 3-tap filter is shown in FIG. 16, a filter having any number of taps can be used.

The display control unit 207 synthesizes the n-channel processed moving image data adjusted to the different image qualities by the image quality adjusting units 204-1 to 204-n in the adjustment modes. This synthesized data is converted into sample moving image data for image quality adjustment, and moving images for adjustment having the layout shown in FIG. 10 or 11 are displayed in real time.

After that, the image quality can be set by selecting an image having desired image quality from the images for adjustment shown in FIG. 10 or 11 in the same manner as in the first embodiment in accordance with the flow charts shown in FIGS. 12 and 13.

In this embodiment as described above, different image quality adjusting processes are performed for a plurality of moving image data indicating the same image, and these moving images are displayed on the same screen. Therefore, an operator can select desired image quality by comparing a plurality of moving image samples indicating the same image, which are displayed on the display unit 211. This allows the operator to easily adjust the television receiver to the desired image quality as in the first embodiment.

Third Embodiment

The third embodiment based on the television receiver according to the aforementioned first embodiment will be described below. In the following description, a duplicate explanation of the same components as in the first embodiment will be omitted, and the characteristic parts of this embodiment will be principally explained.

FIG. 5 is a block diagram showing the configuration of a television receiver according to the third embodiment. Referring to FIG. 5, the solid lines indicate data lines, and the broken lines indicate control lines.

This television receiver shown in FIG. 5 comprises a tuner unit 601, a decoder unit 602, a first switch unit 603, a resolution conversion unit 604, a trimming unit 605, a first memory unit 606, a second switch unit 607, an image quality adjusting unit 608, a display control unit 609, an operation input unit 610, a system control unit 611, a second memory unit 612, a display unit 613, an external input unit 614, and an antenna 615.

First, the difference of this embodiment from the first embodiment will be described below.

In the first embodiment, the image processing unit 103 performs reduction (resolution conversion) or trimming. In the third embodiment, however, these resolution conversion and trimming can be switched in accordance with the number of image quality adjustment components (combination patterns).

For example, in the adjustment window shown in FIG. 10 or 11, the display size of one sample decreases as the number of choices (modes) increases. When the size of one image decreases, the resolution of the image extremely decreases if the image is reduced by resolution conversion, and this makes comparison of image qualities difficult. Hence, if the number of images to be displayed on one screen exceeds a predetermined number, trimming, rather than reduction, makes still images of samples easy to see. In this embodiment, therefore, resolution conversion and trimming are switched in accordance with the number of images to be displayed (image quality adjustment components).

The operation of the television receiver according to this embodiment will be described below. The television receiver of this embodiment can also take two different operation modes: an adjustment mode in which the image quality of a displayed image can be adjusted; and a normal mode in which a user can watch television as a common television receiver without performing any image quality adjustment.

That is, in the normal mode the decoder unit 602 decodes an output signal from the tuner unit 601 or a bit stream supplied from the external input unit 614. The decoded signal is supplied to the image quality adjusting unit 608 via the switch unit 607. The image quality adjusting unit 608 converts the decoded signal into a composite signal by performing predetermined image quality adjustment of adjusting the signal to currently set image quality. The display control unit 609 displays an image based on the composite signal on the display unit 613.

In the adjustment mode, the decoder unit 602 extracts a still image of a given frame from a decoded signal of an input signal. If the number of image quality adjustment components (combination patterns) which can be referred to is a predetermined number or more, the still image is input to the trimming unit 605 via the first switch unit 603 and trimmed to a desired size.

If the number is smaller than the predetermined value, the still signal is input to the resolution conversion unit 604 and reduced to desired resolution. The still image processed by the resolution conversion unit 604 or the trimming unit 605 is stored in the first memory unit 606. The image quality adjusting unit 608 repeatedly reads out the processed still image data of one frame, stored in the first memory unit 606, a plurality of times, and performs different image adjustment processes for these readout processed still images.

The processed still images given the different image qualities by the processes performed by the image quality adjusting unit 608 are output to the display control unit 609. The display control unit 609 synthesizes these processed still image data to generate sample image data of one frame for image quality adjustment, outputs the data to the display unit 613, ad displays the data as shown in FIG. 10 or 11.

After that, as shown in FIGS. 12 and 13, an image quality setting process is performed by selecting an image having a desired image quality mode from the displayed images for image quality adjustment in the same manner as in the first and second embodiments.

In this embodiment as described above, not only effects similar to the first embodiment can be obtained, but also the convenience can be improved because reduction or trimming is properly selected in accordance with the number of image quality adjustment components (combination patterns) which can be referred to.

Fourth Embodiment

The fourth embodiment based on the television receivers according to the aforementioned first to third embodiments will be described below. In the following description, a duplicate explanation of the same components as in the first to third embodiments will be omitted, and the characteristic parts of this embodiment will be principally explained.

FIG. 6 is a block diagram showing the configuration of a television receiver according to the fourth embodiment. Referring to FIG. 6, the solid lines indicate data lines, and the broken lines indicate control lines.

This television receiver shown in FIG. 6 comprises a tuner unit 701, a decoder unit 702, a first switch unit 703, a resolution conversion unit 704, a trimming unit 705, image quality adjusting units 706-1 to 706-n, an image quality adjusting unit 707, a second switch unit 708, a display control unit 709, an operation input unit 710, a system control unit 711, a memory unit 712, a display unit 713, an external input unit 714, and an antenna 715.

First, the difference of this embodiment from the first to third embodiments will be described below.

In the first embodiment, the image processing unit 103 performs reduction (resolution conversion) or trimming for a still image of one frame. In the fourth embodiment, however, resolution conversion and trimming can be switched for a moving image in accordance with the number of image quality adjustment components (combination patterns). Reduction and trimming are switched for the same reason as explained in the third embodiment; to allow easy recognition of a moving image by an operator.

Also, to process moving images this embodiment includes a plurality of image quality adjusting units 706-1 to 706-n each for generating a processed moving image as in the third embodiment. When adjusting the image quality, each unit improves the image quality by adding filter processing in the direction of a time base.

The operation of the television receiver according to this embodiment will be described below. The television receiver of this embodiment can also take two different operation modes: an adjustment mode in which the image quality of a displayed image can be adjusted; and a normal mode in which a user can watch television as a common television receiver without performing any image quality adjustment.

That is, in the normal mode the operation is the same as in the second embodiment. In the adjustment mode, as in the third embodiment, the resolution conversion unit 704 or the trimming unit 705 reduces or trims an output moving image signal from the decoder unit 702 in accordance with the number of image quality adjustment components (combination patterns) which can be referred to.

The output process moving image from the resolution conversion unit 704 or the trimming unit 705 is input to the image quality adjusting units 706-1 to 706-n and adjusted to different image qualities. After that, a plurality of resulting processed moving image data are input to the display control unit 709 via the second switch unit 708. The display control unit 709 synthesizes these processed moving image data to generate sample moving image data for image 20 quality adjustment having the layout shown in FIG. 10 or 11. The data is output to and displayed on the display unit 713.

After that, in accordance with the flow charts shown in FIGS. 12 and 13, image quality setting can be performed by selecting an image having desired image quality from the images for adjustment shown in FIG. 10 or 11 in the same manner as in the first embodiment.

In this embodiment as described above, not only effects similar to the first and second embodiments can be obtained, but also the convenience can be improved because reduction or trimming is properly selected in accordance with the number of image quality adjustment components (combination patterns) which can be referred to.

Other Embodiments

The present invention can be applied to a system constituted by a plurality of devices (e.g., a host computer, interface, reader, and printer) or to an apparatus (e.g., a copying machine or facsimile) comprising a single device.

Further, the object of the present invention can also be achieved by providing a storage medium (recording medium) storing program codes of software for implementing the aforesaid functions according to the embodiments to a system or an apparatus, reading the program codes with a computer (or a CPU or MPU) of the system or apparatus from the storage medium, and then executing the program.

In this case, the program codes read from the storage medium realize the functions according to the aforementioned embodiments, and the storage medium storing the program codes constitutes the invention.

Furthermore, besides aforesaid functions according to the above embodiments are realized by executing the program codes which are read by a computer, the present invention includes a case where an OS (Operating System) or the like running on the computer performs a part or the whole of actual processing in accordance with designations by the program codes and realizes functions according to the above embodiments.

Furthermore, the present invention also includes a case where, after the program codes read from the storage medium are written in a memory of a function extension card which is inserted into a computer or of a function extension unit which is connected to a computer, a CPU or the like of the function extension card or unit performs a part or the whole of actual processing in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting moving image data;
   extracting means for extracting image data of one desired frame from the moving image data to generate extracted image data;
   processing means for performing at least one of trimming and resolution converting the extracted image data;
   image quality adjusting means for performing different image quality adjusting processes for a plurality of one-frame image data indicating the same image which are output from said processing means; and
   display control means for controlling a display device to display, on the same screen, a plurality of still images related to the plurality of one-frame image data outputted from said image quality adjusting means.

2. An image processing apparatus according to claim 1, further comprising:

storage means for storing processed still image data which is trimmed and/or resolution converted by the processing means, wherein said image quality adjusting means repeatedly reads out the processed still image data from said storage means.

3. An image processing apparatus comprising:

input means for inputting moving image data;

decoding means for decoding the moving image data to generate decoded moving image data;

processing means for performing at least one of trimming and resolution converting the decoded moving image data to generated processed moving image data;

image quality adjusting means for performing different image quality adjusting processes for the processed moving image data indicating the same image sequence and performing filter processing in the direction of a time base for the processed moving image data to generate quality adjusted moving image data; and display control means for controlling a display device to display, on the same screen, a plurality of moving images related to the plurality of the quality adjusted moving image data output from said image quality adjusting means.

4. An image processing apparatus according to claim 3, wherein said image quality adjusting means includes a plurality of processing unit and wherein the number of the processing units depends upon the number of image quality adjustment components and the number of moving images to be displayed on the same screen.

5. A television receiver comprising:

receiving means for receiving a television signal containing moving image data;

extracting means for extracting image data of one desired frame from the moving image data to generate extracted image data;

processing means for performing at least one of trimming and resolution converting the extracted image data;

image quality adjusting means for performing different image quality adjusting processes for a plurality of one-frame image data indicating the same image which are output from the processing means;

display control means for controlling a display device to display, on the same screen, a plurality of still images related to the plurality of one-frame image data outputted from said image quality adjusting means; and control means for controlling said image quality adjusting means such that the image quality of the output moving image data from the receiving means is adjusted with an adjustment mode stored in storage means in a second operation mode, and the adjustment mode is selected in a first operation mode from different adjustment modes defined in the different image quality adjusting processes.

6. An image processing method comprising:

an input step of inputting moving image data;

an extracting step of extracting image data of one desired frame from the moving image data to generate extracted image data;

a processing step of performing at least one of trimming and resolution converting the extracted image data;

an image quality adjusting step of performing different image quality adjusting processes for a plurality of one-frame image data indicating the same image which is generated in the processing step; and a display control step of controlling a display device to display, on the same screen, a plurality of still images related to the plurality of one-frame image data generated in the image quality adjusting step.

7. An image processing method comprising:

an input step of inputting moving image data;

a decoding step of decoding the moving image data to generate decoded moving image data;

a processing step of performing at least one of trimming and resolution converting the decoded moving image data to generated processed moving image data;

an image quality adjusting step of performing different image quality adjusting processes for the processed moving image data indicating the same image sequence and performing filter processing in the direction of a time base for the processed moving image data to generate quality adjusted moving image data; and a display control step of controlling a display device to display, on the same screen, a plurality of moving images related to the plurality of quality adjusted moving image data generated in the image quality adjusting step.

* * * * *

UNITED STATES PATENT AND TRADEMARK OFFICE
CERTIFICATE OF CORRECTION

PATENT NO. : 6,791,624 B1
DATED : September 14, 2004
INVENTOR(S) : Kazumi Suga

It is certified that error appears in the above-identified patent and that said Letters Patent is hereby corrected as shown below:

Column 7,
Line 14, "one each" should read -- on each --.

Column 9,
Line 11, "of o e" should read -- of one --.

Column 11,
Line 2, "anew" should read -- a new --.

Column 14,
Line 8, "trimming" should read -- trimming units --.
Line 62, "ad displays" should read -- and displays --.

Column 15,
Line 37, "embodiment;" should read -- embodiment: --.
Line 60, "process" should read -- processed --.
Line 67, "20" should be deleted.

Column 16,
Line 2, "713." should read -- 709. --.
Line 63, "image" (second occurrence) should read -- images --.

Column 18,
Line 35, "generated" should read -- generate --.

Signed and Sealed this

Twenty-sixth Day of July, 2005

JON W. DUDAS
*Director of the United States Patent and Trademark Office*